United States Patent
Hansaki et al.

(10) Patent No.: US 8,576,452 B2
(45) Date of Patent: Nov. 5, 2013

(54) IMAGE PROCESSING APPARATUS AND IMAGE PROCESSING METHOD

(75) Inventors: Tomoyuki Hansaki, Kawasaki (JP); Takatoshi Ota, Yokohama (JP); Hiroaki Sugiura, Yokohama (JP); Koji Ito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 12/404,618

(22) Filed: Mar. 16, 2009

(65) Prior Publication Data

US 2009/0244572 A1  Oct. 1, 2009

(30) Foreign Application Priority Data

Mar. 31, 2008  (JP) ................... 2008-091558

(51) Int. Cl.
  *H04N 1/40*  (2006.01)
(52) U.S. Cl.
  USPC ........... 358/3.21; 358/1.8; 358/1.9; 358/3.01; 358/3.03; 358/3.06; 358/3.23; 358/3.24; 358/3.26; 347/174
(58) Field of Classification Search
  USPC ................. 358/1.9, 3.06, 3.03–3.05
  See application file for complete search history.

(56) References Cited

U.S. PATENT DOCUMENTS

| | | | |
|---|---|---|---|
| 5,949,965 A | 9/1999 | Gondek | |
| 6,118,935 A * | 9/2000 | Samworth | 358/1.9 |
| 6,511,143 B1 | 1/2003 | Ishikawa | |
| 6,834,926 B2 * | 12/2004 | Shibata | 347/15 |
| 7,099,046 B2 | 8/2006 | Yamada et al. | |
| 7,139,096 B2 * | 11/2006 | Ishikawa | 358/1.8 |
| 7,321,447 B2 * | 1/2008 | Kuiper | 358/1.9 |
| 7,452,047 B2 * | 11/2008 | Heydinger | 347/15 |
| 7,639,399 B2 * | 12/2009 | Ikeda | 358/3.03 |
| 7,965,418 B2 | 6/2011 | Yamada et al. | |
| 2002/0097456 A1 * | 7/2002 | Yamada et al. | 358/536 |
| 2003/0025749 A1 | 2/2003 | Krouss | |
| 2003/0202215 A1 * | 10/2003 | Biddle et al. | 358/3.26 |
| 2008/0036811 A1 * | 2/2008 | Heydinger | 347/15 |
| 2008/0137146 A1 * | 6/2008 | Marumoto | 358/3.03 |

FOREIGN PATENT DOCUMENTS

| | | |
|---|---|---|
| JP | 07-013399 A | 1/1995 |
| JP | 2002-127393 A | 5/2002 |
| JP | 2003-116015 A | 4/2003 |
| JP | 2005-280276 A | 10/2005 |
| WO | 2008-026592 A1 | 3/2008 |
| WO | 2008/026592 A1 | 3/2008 |

* cited by examiner

*Primary Examiner* — Richard Zhu
(74) *Attorney, Agent, or Firm* — Canon USA Inc IP Division

(57) ABSTRACT

An image processing apparatus includes a dividing unit configured to divide image data into pieces of print scan image data for the plurality of print scans, a quantization unit configured to quantize the pieces of print scan image data, and a generation unit configured to generate pieces of print data for the plurality of print scans on the basis of the quantized pieces of print scan image data. In a case where a density represented by the pieces of print scan image data is a low density, the quantization unit quantizes the pieces of print scan image data so that they are mutually exclusive in the plurality of print scans.

16 Claims, 16 Drawing Sheets

FIG. 10
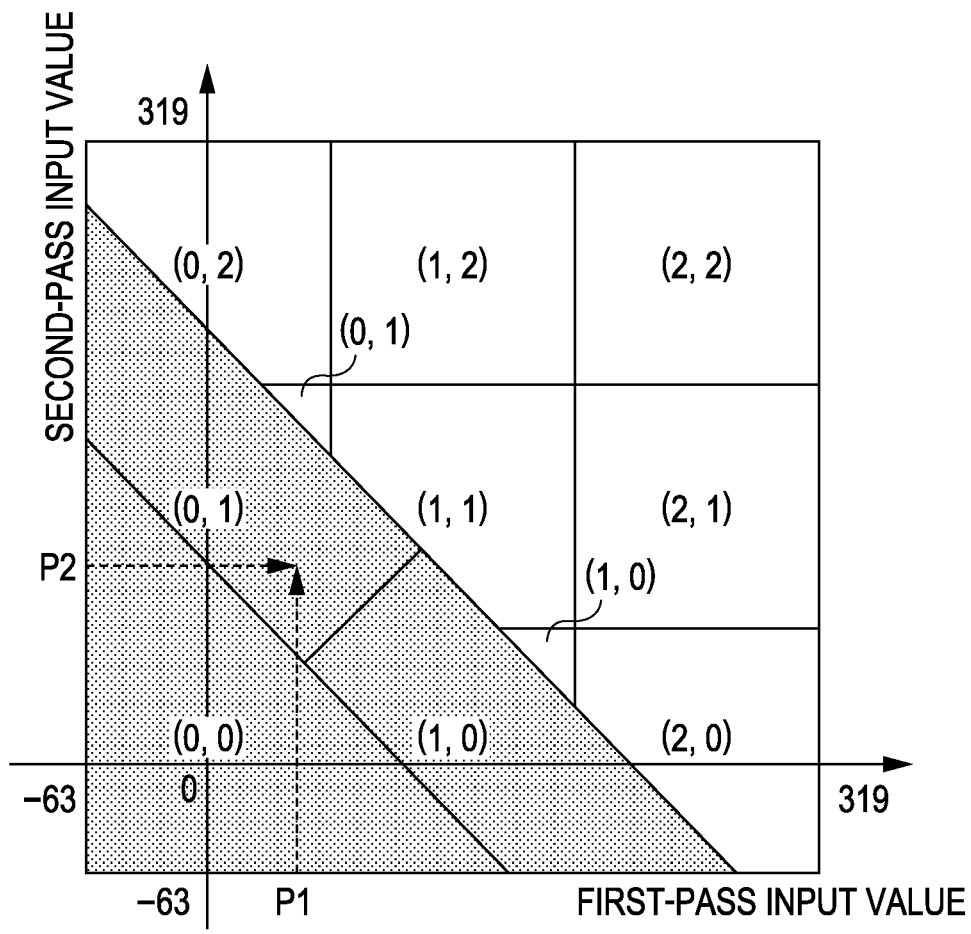
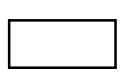 REGION 1001 WHERE PASS IMAGES ARE INDEPENDENTLY QUANTIZED
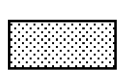 REGION 1002 WHERE PASS IMAGES ARE EXCLUSIVELY QUANTIZED
* VALUES IN PARENTHESES ARE OUTPUT VALUES
(FIRST-PASS OUTPUT VALUE, SECOND-PASS OUTPUT VALUE)

| VALUE | DOT LAYOUT |
|---|---|
| 0 | ☐ |
| 1 | ◱ |
| 2 | ◨ |

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

As exemplary image forming apparatuses for forming an image by performing a print scan a plurality of times upon the same image area on a print medium, ink-jet printers are known.

Ink-jet printers print an image on a print medium by repeatedly performing an operation of causing a printhead to eject ink droplets onto the print medium while reciprocally moving in a main scanning direction and an operation of conveying the print medium in a sub-scanning direction. In such an ink-jet printer, the variations in the orientation and size of an ink droplet and the position at which an ink droplet lands occur at the time of printing due to errors caused by physical factors such as the characteristic differences among nozzles and the inaccuracies of a sheet conveying distance and a printhead moving distance. These variations appear as density unevenness or stripes on an image printed by a single print scan, and thus degrade image quality.

As a method of preventing the occurrence of such density unevenness and stripes, a multi-pass printing method is known. The multi-pass printing method is a method of performing image processing and printing control in combination, and can achieve rapid image formation while suppressing degradation in image quality due to density unevenness or stripes.

The multi-pass printing method will be described in detail below with reference to FIG. 12.

Referring to FIG. 12, a printhead 5101 is composed of nozzles 5102. For simplification of explanation, it is assumed that the printhead 5101 is composed of eight nozzles 5102. From the nozzles 5102, ink droplets 5103 are ejected. In general, in order to complete printing of a print area on a predetermined print medium by a single print scan, it is desirable that the same amount of ink be ejected from the nozzles 5102 in the same direction as illustrated in FIG. 12.

However, as described previously, if printing of an image is performed by a single print scan, the size and orientation of an ink droplet ejected from a nozzle vary from nozzle to nozzle due to an error caused by a physical factor at the time of printing. As a result, a blank portion periodically appears or an excessive number of dots overlap one another in a head main scanning direction on a print medium. A group of dots that land in this state is perceived as density unevenness in a nozzle array direction on a print medium. If there is a misalignment between print areas printed in print scans, the boundary between these print areas is perceived as a stripe.

In the multi-pass printing method, as illustrated in FIG. 13, a printhead 5201 performs a print scan a plurality of times (three times in this case). Referring to FIG. 13, printing of each print area including four pixels (half the length in the vertical direction in which eight pixels are arranged) is completed by two print scans. In this case, eight nozzles 5202 included in the printhead 5201 are divided into a group of four upper nozzles (upper nozzle group) and a group of four lower nozzles (lower nozzle group). A dot printed by each nozzle in a single print scan corresponds to data obtained by thinning out image data to about half in accordance with a predetermined image data arrangement. In a second print scan, dots corresponding to about the remaining half of the image data are embedded into an image formed in the first print scan, so that printing of a four-pixel unit area is completed.

In the multi-pass printing method, for example, a two-pass printing method, a first print scan and a second print scan complement each other in accordance with a predetermined image data arrangement. As the predetermined image data arrangement (thinning-out mask pattern), an arrangement illustrated in FIG. 14 in which pixels are vertically and horizontally staggered one by one is generally used. Accordingly, printing of a print unit area (a four-pixel unit area in this case) is completed by a first print scan for printing a staggered pattern and a second print scan for printing an inverse-staggered pattern. FIG. 14 illustrates a process of completing printing of the same area using the staggered and inverse-staggered patterns. That is, as illustrated in the upper part of FIG. 14, in a first print scan, printing of the staggered pattern (black circles) is performed in a predetermined region on a print medium using the four lower nozzles. Subsequently, as illustrated in the middle part of FIG. 14, in a second print scan, a sheet is fed by four pixels, and printing of the inverse-staggered pattern (white circles) is performed in the area on the print medium using all of the eight nozzles. Subsequently, as illustrated in the lower part of FIG. 14, in a third print scan, the sheet is fed by four pixels, and printing of the staggered pattern is performed again in the region on the print medium using the four upper nozzles.

Even if a multi-head with variations like those illustrated in FIG. 13 is used, the multi-pass printing method can reduce the influence of the variations on a print area by half. Even if there is a misalignment between print areas printed in print scans, the multi-pass printing method can reduce the influence of the misalignment by half. As a result, density unevenness is reduced on a formed image. An exemplary case in which printing of a unit area is completed by two print scans has been described. If the number of print scans is increased, the influence of the above-described variations or the above-described misalignment can be further minimized. Accordingly, the density unevenness can be reduced in proportion to the number of print scans. Conversely, the time for printing is increased in proportion to the number of print scans.

If the number of print scans is reduced so as to perform high-speed printing, it is difficult to average the variations in the ink droplet or the misalignment between passes, and the density unevenness is therefore more pronounced than that in a case where the number of print scans is not reduced. Accordingly, in order to improve image quality in high-speed printing in which a small number of print scans are performed, a dot arrangement is required which has a characteristic highly resistant to the variations in the ink droplet or the misalignment between passes (a characteristic highly resistant to reduction in image quality).

A technique for creating from image data print data used for each print scan by performing thinning with a random thinning-out pattern that uses random numbers or the like is known. For example, it is assumed that printing is performed by two print scans using the above-described technique. In a first print scan, thinning is performed with a random thinning-out pattern that uses random numbers or the like, and in a second print scan, thinning is performed with the inverse thinning-out pattern of the random thinning-out pattern, so that each pieces of print data is created. In this case, there is no regularity in a dot arrangement, and image quality is therefore improved as compared with printing in the related art in which two print scans are performed. As described previously, however, the variations in the ink droplet and the misalignment between print scans occur at the time of printing. In the above-described technique, since the complementary relationship between print scans is formed by performing thinning using a mask pattern in each of the print scans, the variations in the ink droplet and the misalignment between print scans lead to the overlapping of dots and the periodic appearance of a blank portion which are easily perceived as density unevenness. In particular, if dot patterns interfere with each other due to the misalignment between print scans, density unevenness and stripes appear as an undesirable pattern after scanning.

It is therefore required to prevent any dot patterns created in print scans from interfering with each other in a case where the misalignment between the print scans occurs. However, it is difficult to create a mask pattern capable of preventing the interference between dot patterns which can be used for any input image.

As a method of overcoming the above-described difficulties, a method of dividing each pixel value which is multi-valued image data into pieces of multi-valued image data that are individually used for print scans, quantizing these pieces of multi-valued image data, and generating print scan images between which there is an incomplete complementary relationship using these pieces of multi-valued image data is known. This method can reduce the influence of the variations in the ink droplet or the misalignment between passes on image density, and improve image quality.

However, if print scan images are generated using the above-described method, quantization is performed in each of the print scans. Thus, in this method, the relationship between dot arrangements obtained by the print scans is not taken into account. As a result, in dot patterns generated in the print scans, dot sparse/dense portions may appear. These portions are perceived as density unevenness on a printed image, and therefore become the cause of the reduction in image quality. In particular, in a low-density portion on the printed image, dots obtained in passes are close to each other and a blank portion is present. Thus, dot sparse/dense portions are apt to be conspicuous. FIG. 15 is a diagram illustrating an arrangement of dots generated from an input image of uniform density (low density) using the above-described method. As is apparent from FIG. 15, dots are nonuniformly arranged, and some of these dots overlap each other. Accordingly, in order to improve image quality, it is required to take a dot arrangement in a low-density portion into account.

SUMMARY OF THE INVENTION

The present invention provides an image processing apparatus and an image processing method capable of minimizing density unevenness on an image formed using a multi-pass printing method.

There is provided an image processing apparatus for generating print data to be used for an image forming apparatus for performing image formation by performing a plurality of print scans upon the same image area on a print medium. The image processing apparatus includes: a dividing unit configured to divide image data into pieces of print scan image data for the plurality of print scans; a quantization unit configured to quantize the pieces of print scan image data; and a generation unit configured to generate pieces of print data for the plurality of print scans on the basis of the quantized pieces of print scan image data. In a case where a density represented by the pieces of print scan image data is a low density, the quantization unit quantizes the pieces of print scan image data so that they are mutually exclusive in the plurality of print scans.

Furthermore, there is provided an image processing method of generating print data to be used for an image forming apparatus for performing image formation by performing a plurality of print scans upon the same image area on a print medium. The image processing method includes: dividing image data into pieces of print scan image data for the plurality of print scans; quantizing the pieces of print scan image data; and generating pieces of print data for the plurality of print scans on the basis of the quantized pieces of print scan image data. In a case where a density represented by the pieces of print scan image data is a low density, the pieces of print scan image data are quantized so that they are mutually exclusive in the plurality of print scans.

Moreover, there is provided a computer-readable storage medium containing computer-executable instructions for controlling an image processing apparatus for generating print data to be used for an image forming apparatus for performing image formation by performing a plurality of print scans upon the same image area on a print medium. Here, the medium includes computer-executable instructions that divide image data into pieces of print scan image data for the plurality of print scans; computer-executable instructions that quantize the pieces of print scan image data; and computer-executable instructions that generate pieces of print data for the plurality of print scans on the basis of the quantized pieces of print scan image data. In a case where a density represented by the pieces of print scan image data is a low density, the pieces of print scan image data is quantized so that they are mutually exclusive in the plurality of print scans.

Further features of the present invention will become apparent from the following description of exemplary embodiments with reference to the attached drawings.

BRIEF DESCRIPTION OF THE DRAWINGS

FIG. 10 is a diagram illustrating a lookup table used in the dot dispersion error diffusion processing.

DESCRIPTION OF THE EMBODIMENTS

Figure 1:
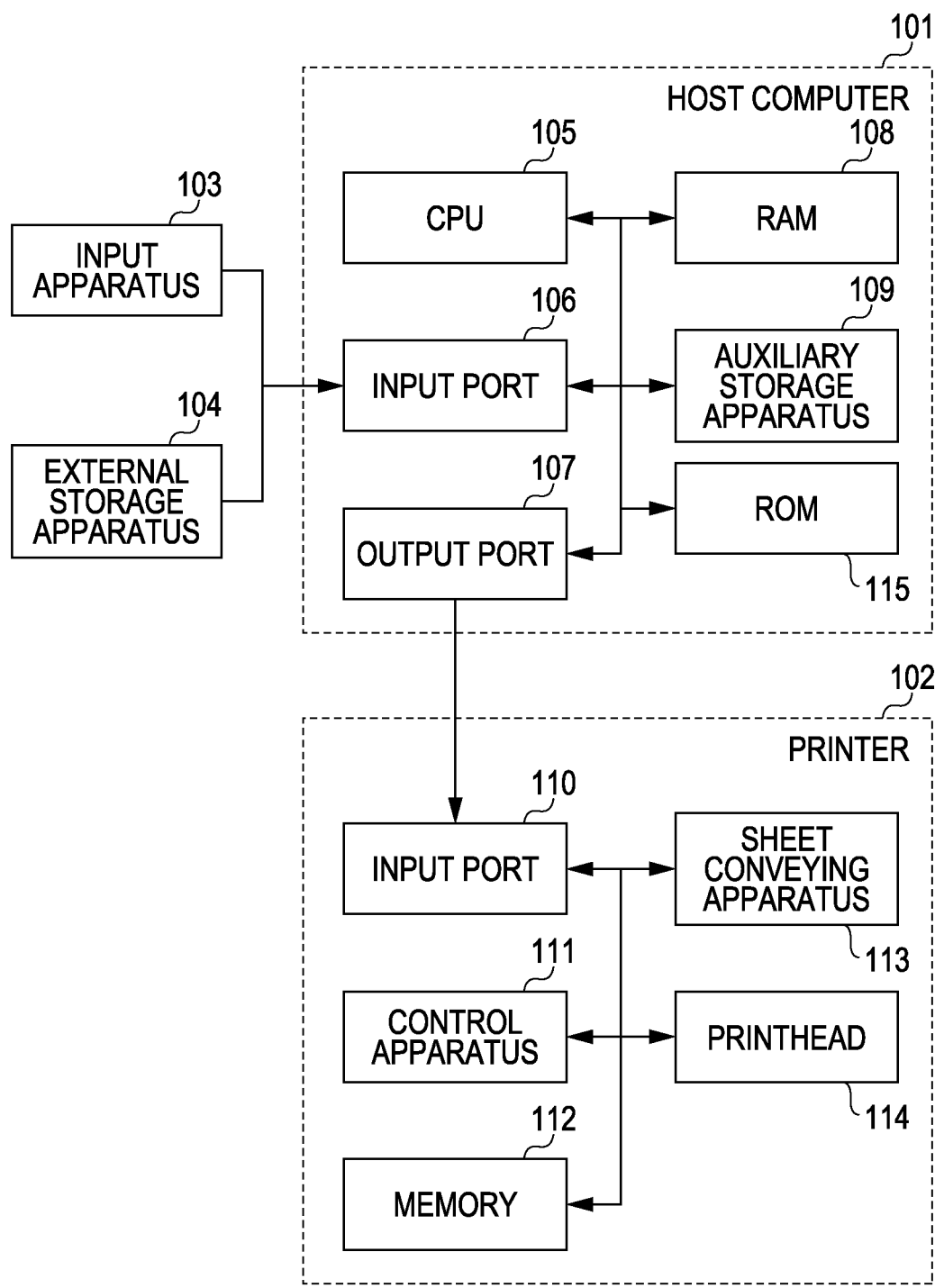
FIG. 1 is a block diagram illustrating an exemplary configuration of a print system according to a first embodiment of the present invention.

Embodiments of the present invention will be described in detail below with reference to the accompanying drawings. An arrangement according to each embodiment to be described later is merely an example, and the present invention is not limited to arrangements illustrated in drawings.

A first embodiment of the present invention will be described below referring to the drawings. In this embodiment, a case in which an ink-jet printer performs two print scans using a multi-pass method will be described.

FIG. 1 is a block diagram illustrating an exemplary configuration of a print system according to the first embodiment. The print system illustrated in FIG. 1 includes a host computer 101, a printer 102, an input apparatus 103, and an external storage apparatus 104. In the host computer 101, a CPU 105 controls the overall operation of the host computer 101 in accordance with programs stored in a RAM 108 and a ROM 115. The RAM 108 is used as a main memory for the CPU 105, and a program to be executed by the CPU 105 is loaded in the RAM 108. The RAM 108 also functions as a work area for the CPU 105, and the CPU 105 temporarily stores various pieces of data in the RAM 108 at the time of a control operation. The ROM 115 stores a boot program and various pieces of data in a non-volatile manner. The host computer 101 includes an input port 106 such as a LAN or USB port, an output port 107 such as a LAN or USB port, the RAM 108, and an auxiliary storage apparatus 109. The input port 106 of the host computer 101 is connected to the input apparatus 103 such as a scanner or digital camera and the external storage apparatus 104 such as a CD-ROM drive or memory card reader. The output port 107 of the host computer 101 is connected to the printer 102. The printer 102 includes an input port 110 such as a USB or LAN port for receiving print data or control information, a control apparatus 111 for controlling an operation performed in the printer, a memory 112 for storing print data and internal setting information, a sheet conveying apparatus 113, and a printhead 114 with nozzles for ejecting ink onto a print medium.

Figure 2:
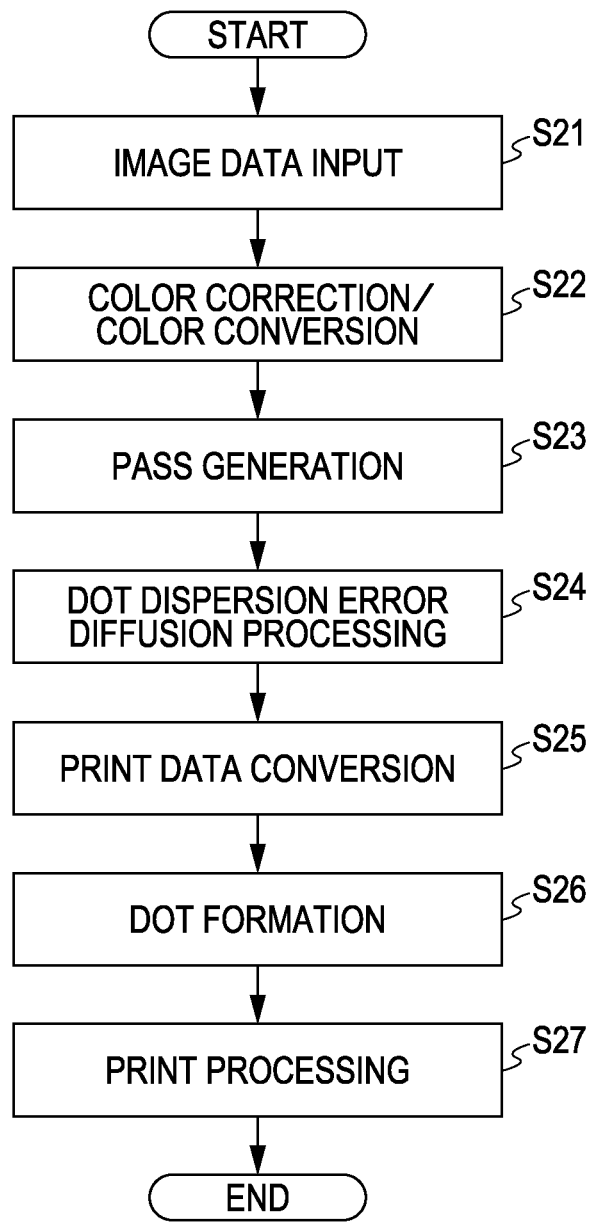
FIG. 2 is a diagram illustrating a process according to the first embodiment.
Figure 5:
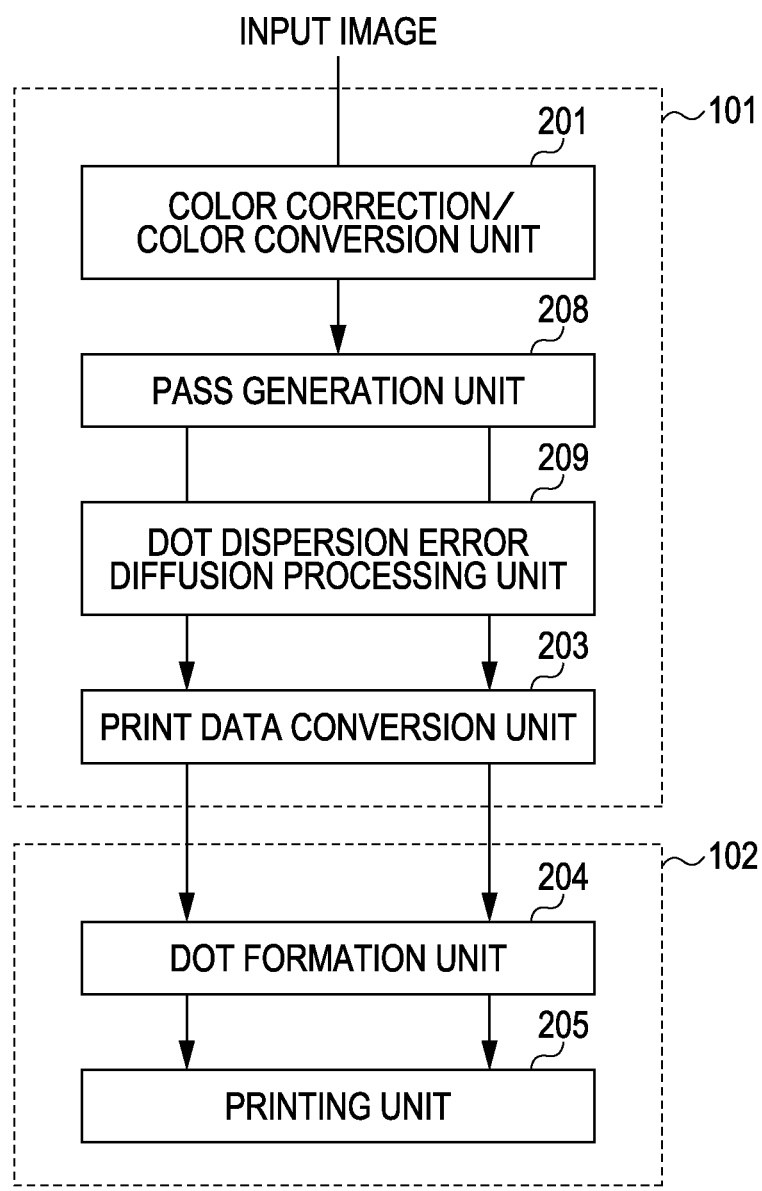
FIG. 5 is a diagram describing each processing unit included in a host computer and a printer.

FIG. 2 is a diagram illustrating a process according to this embodiment. The process from step S21 to step S25 is performed by the host computer 101, and the process from step S26 to step S27 is performed by the printer 102. However, the process from step S21 to step S27 may be performed by the printer 102. FIG. 5 is a diagram describing each processing unit included in the host computer 101 and the printer 102. Referring to FIG. 5, the host computer 101 includes a color correction/color conversion unit 201 for performing color correction and color conversion upon an input image, a pass generation unit 208 for generating a pass image, a dot dispersion error diffusion processing unit 209 for performing quantization upon each pass image, and a print data conversion unit 203 for performing print data conversion. The printer 102 includes a dot formation unit 204 for forming dots corresponding to each quantized pass image, and a printing unit 205 for printing an image on a print medium.

A process according to this embodiment will be described below with reference to FIG. 2. First, the input apparatus 103 inputs an image to be printed into the host computer 101 (step S21). The input color or gray-scale image is transmitted to the color correction/color conversion unit 201 illustrated in FIG. 5. The color correction/color conversion unit 201 performs color correction in accordance with the setting of printing, and converts RGB components generally used for image data into CMYK components suitable for printing by a printer (step S22). In general, these components are separately processed, and one of these components will be described.

Figure 6:
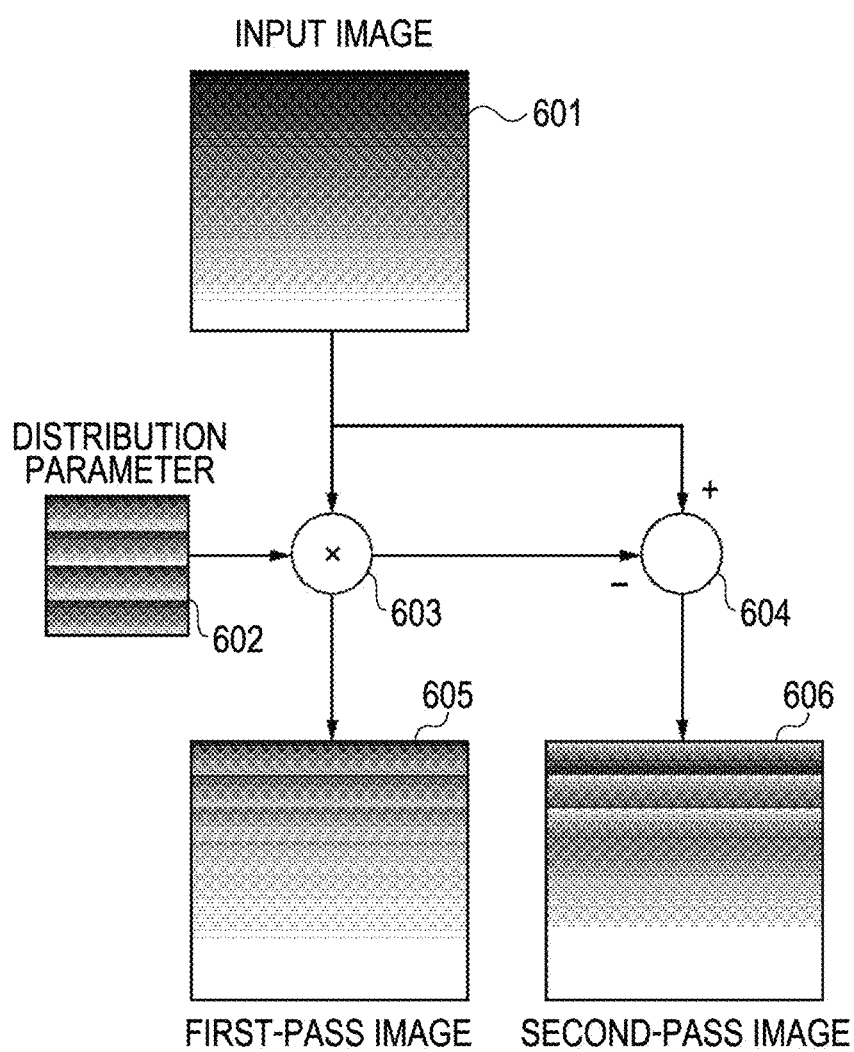
FIG. 6 is a diagram describing a pass generation process.
Figure 7:
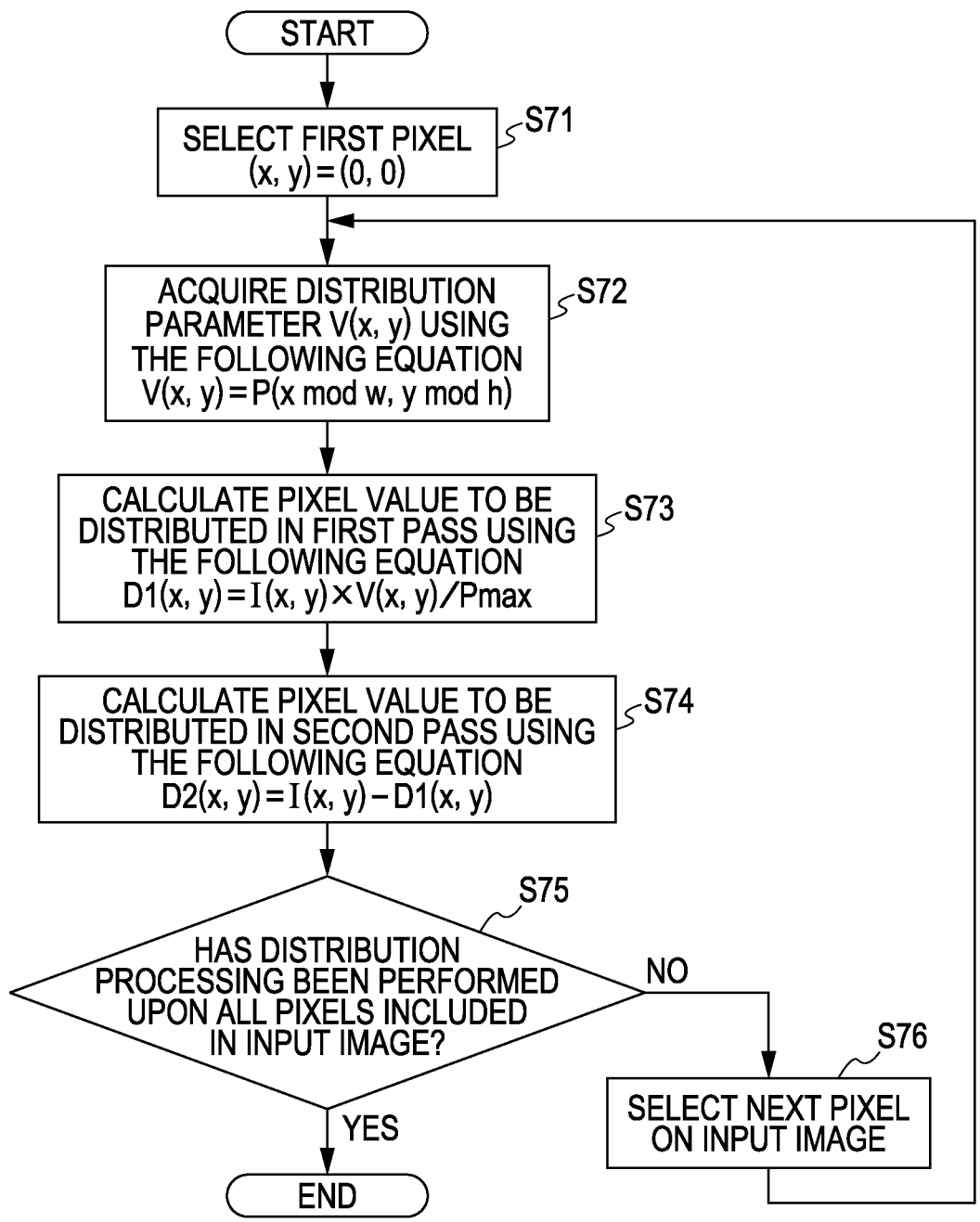
FIG. 7 is a diagram describing in detail the pass generation process.

The pass generation unit 208 illustrated in FIG. 5 performs pass generation for an image having the converted CMYK components (step S23). The pass generation means the generation of image data to be used for each print scan in a multi-pass method. FIG. 6 is a diagram describing a pass generation process. Referring to FIG. 6, an input image 601 for which the pass generation is performed, a distribution parameter 602 used to determine a distribution ratio at which a pixel value is distributed to passes, a multiplier 603, and an adder 604 are illustrated. Furthermore, a first-pass image 605 and a second-pass image 606, which are output images, are illustrated. In a pass generation process according to this embodiment, an external parameter such as the distribution parameter 602 for determining a distribution ratio at which a pixel value is distributed to passes is used. FIG. 7 is a diagram describing in detail the pass generation performed in step S23 in FIG. 2. The pass generation will be described in detail below with reference to FIGS. 6 and 7.

First, in step S71, a pixel at a position (0, 0) on the input image 601 is selected. In step S72, a parameter (density value) of a pixel at the same position on the distribution parameter 602 as that of the selected pixel is acquired. If the size of the distribution parameter 602 is smaller than that of the input image 601, the distribution parameter 602 is repeatedly used in a required direction, that is, the distribution parameters 602 are tiled in a required direction. Accordingly, the parameter (density value) can be acquired using the following equation.

$$V(x, y) = P(x \bmod w, y \bmod h)$$

In this equation, (x, y) denotes the position of the selected pixel on an image, w denotes the width of a parameter p, h denotes the height of the parameter p, and V(x, y) denotes the parameter (density value) to be acquired.

In step S73, a first-pass distribution pixel value D1(x, y) to be distributed to a first-pass image is calculated in the multiplier 603 by multiplying a pixel value (input value) I(x, y) of the selected pixel by the ratio of the parameter V(x, y) obtained in step S72 to the maximum parameter Pmax.

$$D1(x, y) = I(x, y) * V(x, y) / P\max$$

The first-pass distribution pixel value D1 is stored in a first-pass image buffer included in the RAM illustrated in FIG. 1. In step S74, a second-pass distribution pixel value D2 is calculated in the adder 604 by subtracting the first-pass distribution pixel value D1 from the input value of the selected pixel. The second-pass distribution pixel value D2 is stored in a second-pass image buffer included in the RAM illustrated in FIG. 1.

$$D2(x, y)=I(x, y)-D1(x, y)$$

In step S75, it is determined whether distribution processing has been performed upon all pixels included in the input image. If it is determined in step S75 that distribution processing has not yet been performed upon all pixels, the next pixel is selected in step S76. The process from step S72 to step S74 is repeated until all pixels are selected, so that the first-pass image 605 and the second-pass image 606 are obtained.

Figure 8:
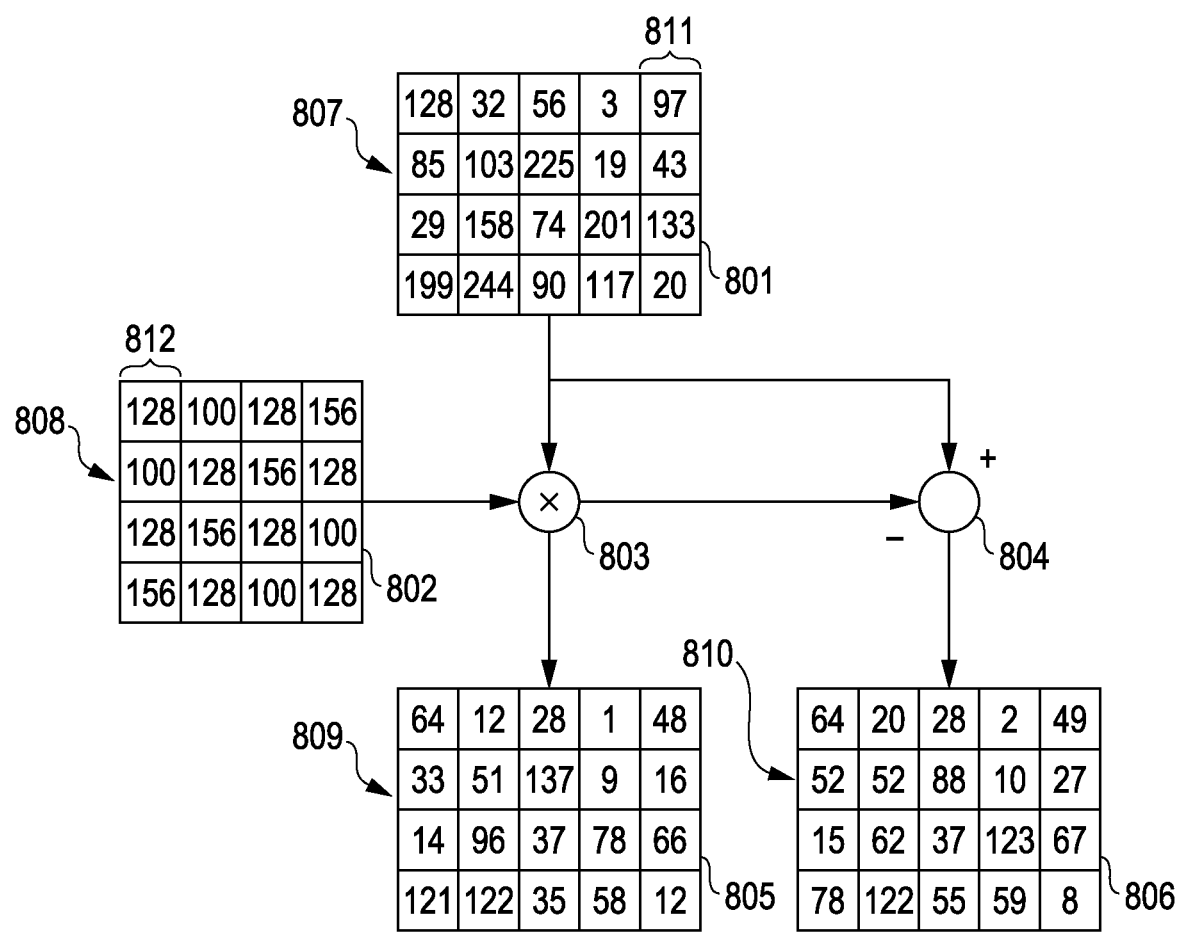
FIG. 8 is a diagram concretely describing the pass generation process.

The pass generation process will be described using specific numerical values. FIG. 8 is a diagram illustrating the pass generation process illustrated in FIG. 6 using specific numerical values. Referring to FIG. 8, an input image 801, a distribution parameter 802, a multiplier 803, an adder 804, a first-pass image 805, and a second-pass image 806 are illustrated. Each value represents a pixel value or a parameter. It is assumed that a pixel 807 is selected. A parameter 808 on the distribution parameter 802 which is present at the same position as that of the pixel 807 is used for the pixel 807. A parameter maximum value is 255. Accordingly, the first-pass distribution pixel value D1 is calculated by substituting I=85, P=100, and Pmax=255 in the above-described equation, so that D1=33 is obtained. Although fractions are omitted in this case, the solution may be rounded off or up to the nearest whole number. The calculated first-pass distribution pixel value D1 corresponds to the value of a pixel 809 on the first-pass image 805. The second-pass distribution pixel value D2 of the pixel 807 is calculated by subtracting the first-pass distribution pixel value D1 from the density value of the pixel 807, so that D2(810)=52 is obtained. All pixels included in the input image 801 are similarly processed, so that the first-pass image and the second-pass image are generated. As described previously, if the size of the distribution parameter 802 is smaller than that of the input image 801, the distribution parameter 802 is repeatedly used in a required direction, that is, the distribution parameters 802 are tiled in a required direction. Accordingly, it is determined which of columns of the parameter 808 is to be used for a fifth column (a column 811 having the coordinates (4, y) of the input image 801) using the above-described equation, so that V(4, y)=P(4 mod 4, y mod 4)=P(0, y) (0≤y≤4) is obtained and a first column of the distribution parameter 802, that is, a column 812, is used.

The distribution parameter sets each parameter so that the distribution of each pixel value produces spatial and periodic changes in the sheet feeding direction and the carriage direction. The distribution of each pixel value may produce spatial and periodic changes in either the sheet feeding direction or the carriage direction or in two or more directions such as the sheet feeding direction and the carriage direction.

Since the distribution of each pixel value is performed so that the distribution produces spatial and periodic changes, a periodic change appears in accordance with a spatial position on a pass image. As a result, as will be described later, pass (print scan) images of different input values are input into the dot dispersion error diffusion processing unit 209 illustrated in FIG. 5. If pass images of the same input value are input into the dot dispersion error diffusion processing unit 209, dot patterns obtained by performing error diffusion processing, print data conversion, and dot formation, which will be described later, upon the pass images may be similar to each other. If the dot patterns obtained from the pass images are similar to each other, these dot patterns may interfere with each other. Accordingly, by making pass images to be input into the dot dispersion error diffusion processing unit 209 have different input values, the generation of similar dot patterns from the pass images can be prevented. This can suppress the interference of the dot patterns on a printed image. Furthermore, the density change due to the misalignment between passes can be suppressed. Even if variations in an ink droplet and the misalignment between passes occur, such a synergistic effect suppresses the interference of dot patterns and degradation in image quality.

Each pass image obtained in the pass generation unit 208 illustrated in FIG. 5 is transmitted to the dot dispersion error diffusion processing unit 209 corresponding to a quantization unit. The dot dispersion error diffusion processing performed by the dot dispersion error diffusion processing unit 209 in step S24 illustrated in FIG. 2 will be described. In the dot dispersion error diffusion processing performed by the dot dispersion error diffusion processing unit 209, a method is used which is similar to an error diffusion processing method (dot dispersion error diffusion method) for preventing cyan and magenta dots from overlapping each other (see, for example, Japanese Patent Laid-Open No. 2003-116015). Japanese Patent Laid-Open No. 2003-116015 discloses the error diffusion processing method (dot dispersion error diffusion method) for preventing dots of different colors (magenta and cyan) from overlapping each other. In this embodiment, the error diffusion processing method (dot dispersion error diffusion method) is not used for the processing performed upon dots of different color components, but is used for the processing performed upon values of pixels of the same component which have been distributed in the pass generation processing.

The dot dispersion error diffusion processing unit 209 performs the error diffusion processing upon low-density portions of the pass images so that dots are mutually exclusive, thereby generating quantized pass images. As a result, in the low-density portions of the pass images, dots are exclusively arranged. A pixel value used in this embodiment is a density value.

Figure 16:
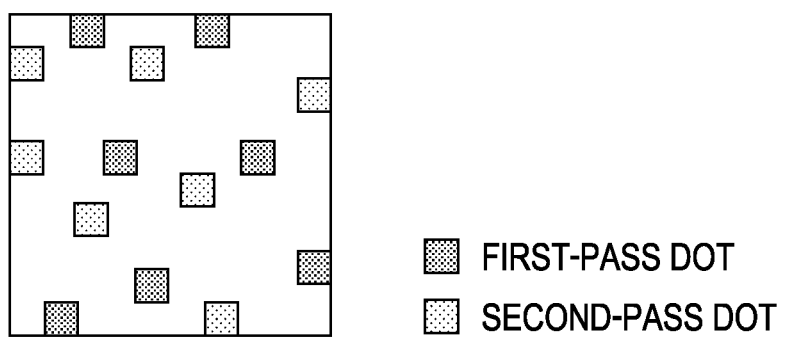
FIG. 16 is a diagram illustrating an exemplary dot arrangement in a low-density portion which is obtained after dot dispersion error diffusion processing has been performed upon two pass images.

FIG. 16 is a diagram illustrating an example of a dot pattern obtained by performing the dot dispersion error diffusion processing upon two pass images in the dot dispersion error diffusion processing unit 209. In this embodiment, two pass images are generated from an input image. From the two pass images, a dot pattern like that obtained by performing error diffusion processing upon a single image can be formed. Since individual dots are appropriately provided for passes, the generation of dot sparse/dense portions is suppressed. Accordingly, even if the variations in an ink droplet and the misalignment between passes occur at the time of printing, density unevenness becomes undetectable. It is very difficult to achieve the above-described method of providing a dot for a pass in a case where a method of fixedly providing a dot for a pass on the basis of the position of a pixel and a method of independently performing quantization in passes, which are methods in the related art, are used.

Figure 9:
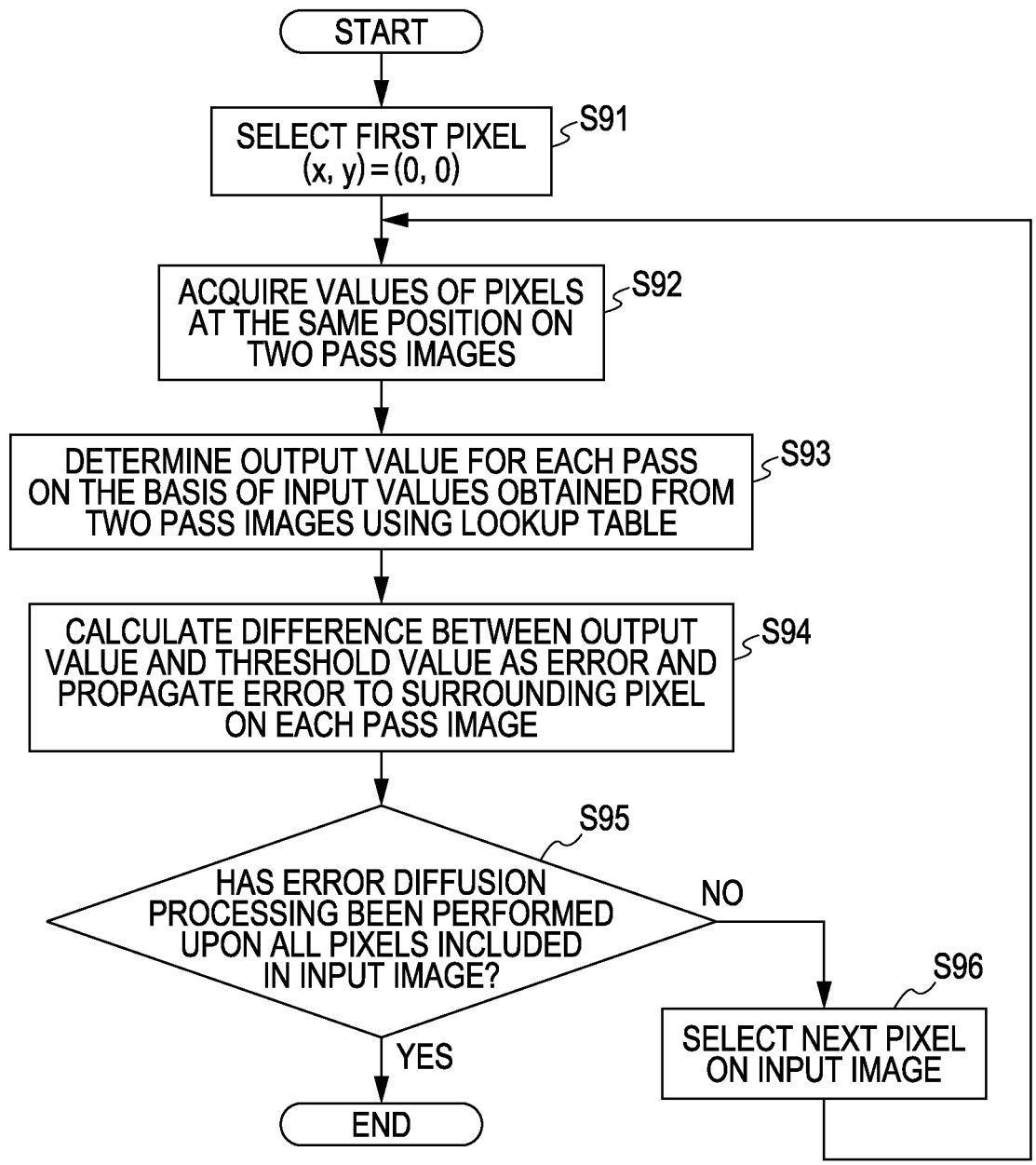
FIG. 9 is a diagram describing in detail dot dispersion error diffusion processing.

FIG. 9 is a diagram describing in detail the dot dispersion error diffusion processing performed in step S24 illustrated in FIG. 2. FIG. 10 is a diagram illustrating an example of a lookup table used to determine an output value from an input value in the dot dispersion error diffusion processing. In this embodiment, a propagated input value including an error ranges from −63 to 319, and a quantization level to be output ranges from 0 to 2. Values in parentheses in each of separate regions are output values. The input value and the quantization level are not limited to the above-described value and level, and may be another value and level.

First, in step S91, a pixel at a position (0, 0) is selected in each of two pass images. In step S92, the pixel value of the selected pixel of each of the pass images (hereinafter referred to as an input value, and the input value includes a propagated error) is obtained. In step S93, output values are determined from the obtained two input values using the lookup table illustrated in FIG. 10. For example, if the input value of the selected pixel of a first-pass image is P1=40 and the input value of the selected pixel of a second-pass image is P2=120, a first-pass output value is 0 and a second-pass output value is 1. In step S94, an error between the first-pass output value and a threshold value and an error between the second-pass output value and a threshold value are calculated on the first-pass and second-pass images, respectively, and the calculated errors are propagated to surrounding pixels on the first-pass and second-pass images. The above-described processing is repeatedly performed upon all pixels (steps S95 and S96).

In the lookup table illustrated in FIG. 10, there are a region 1001 (high-density region) in which pass images are independently quantized and a region 1002 (low-density region) in which pass images are exclusively quantized. As is apparent from the lookup table, while output values are determined without being influenced by input values of pass images in the region 1001 in which pass images are independently quantized, output values are determined under the influence of input values of pass images in the region 1002 in which pass images are exclusively quantized. Thus, in a low-density region (the region 1002), a plurality of pass images are processed as a single pass image so that dots are exclusively arranged in pass images. As a result, since dots become mutually exclusive in the low-density region in the pass images, an image with suppressed density unevenness can be formed. An error to be propagated varies, and the region in which pass images are independently quantized and the region in which pass images are exclusively quantized are alternately used. Accordingly, the degradation in image quality at the boundary between these two regions does not occur. In order to further improve image quality, noise used to change a threshold value required for quantization may be added.

Subsequently, in step S25, the pass images obtained in the dot dispersion error diffusion processing unit 209 are input into the print data conversion unit 203 and are then converted into print data therein.

The converted print data is transmitted from the host computer 101 to the printer 102. The printer 102 receives the print data and stores it in a print buffer included in the memory 112.

Figures 11, 12:
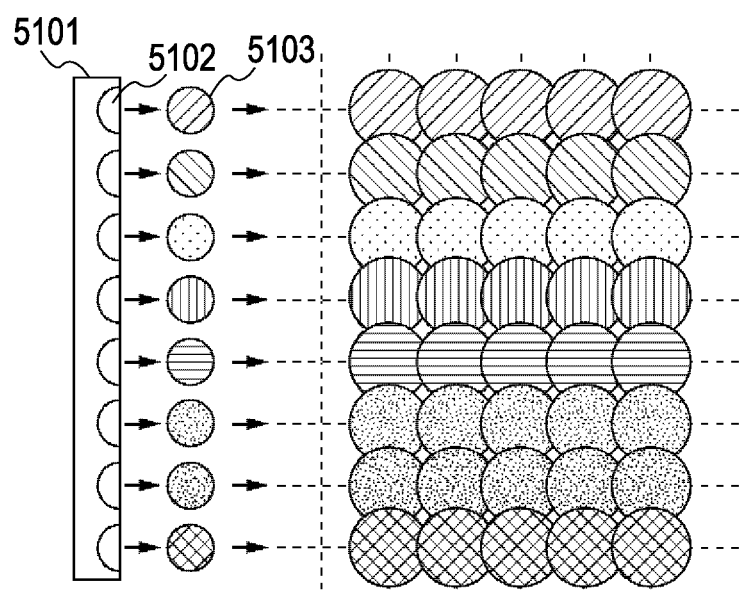
FIG. 11 is a diagram illustrating a table describing the relationship between a quantization level and a dot layout which is used to determine the arrangement of dots.
FIG. 12 is a diagram illustrating a state in which the same amount of ink is ejected in the same direction using the multi-pass printing method.
Figure 13:
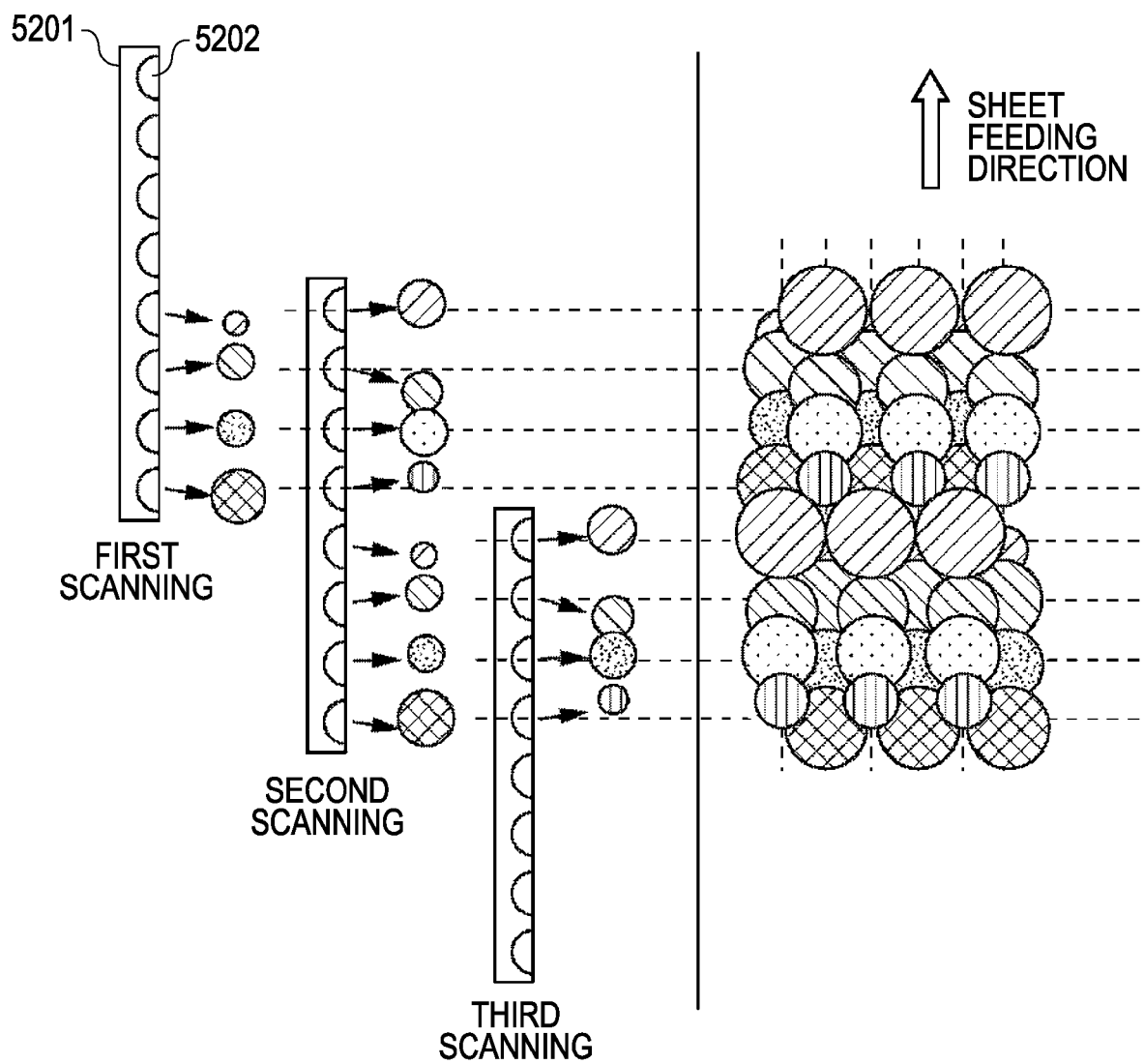
FIG. 13 is a diagram illustrating a process in which a printhead performs main scanning a plurality of times (three times) and completes printing of a print scan unit area including four pixels (half the length in the vertical direction in which eight pixels are arranged) by performing two print scans (in two passes).
Figure 14:
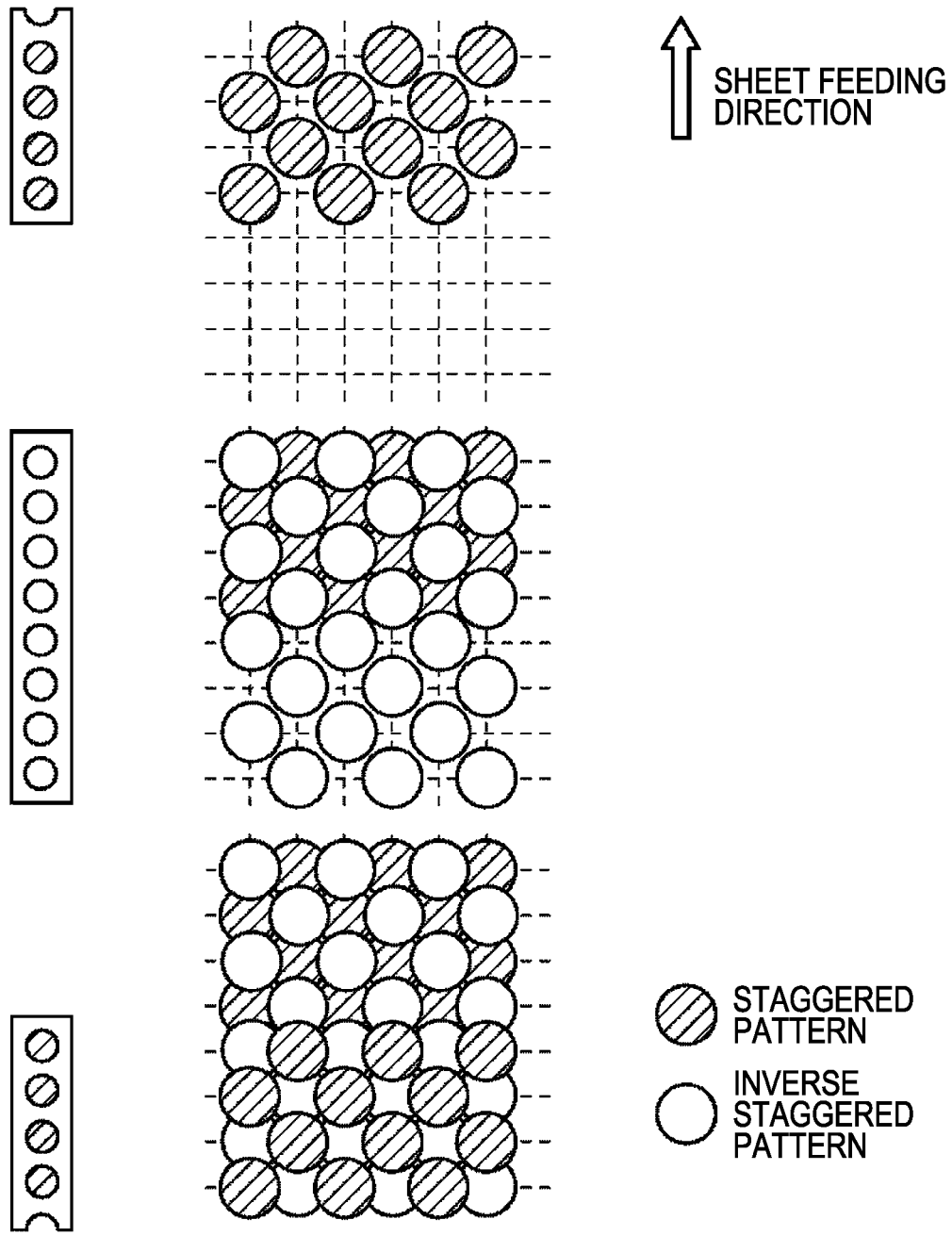
FIG. 14 is a diagram illustrating a process of completing printing of the same area using staggered and inverse-staggered patterns.

In step S26, the dot formation unit 204 converts the print data stored in the print buffer into binary print data indicating whether a dot is ejected (ON or OFF). By allocating a 2×2 region to each pixel included in the print data received by the printer 102, that is, each pixel in an image prior to dot formation, the quantization level can be maintained in data obtained after dot formation. FIG. 11 is a diagram illustrating exemplary dot formation performed on the basis of the relationship between a quantization level and a dot layout into which the quantization level is converted. Dots are arranged on the basis of this relationship. It is not required to perform the above-described dot formation in a case where it is not required to convert the print data into binary data indicating ON or OFF of each dot, for example, in a case where binary data is obtained in the quantization processing or the diameter of each dot to be ejected can be changed two or more diameters.

Figure 3:
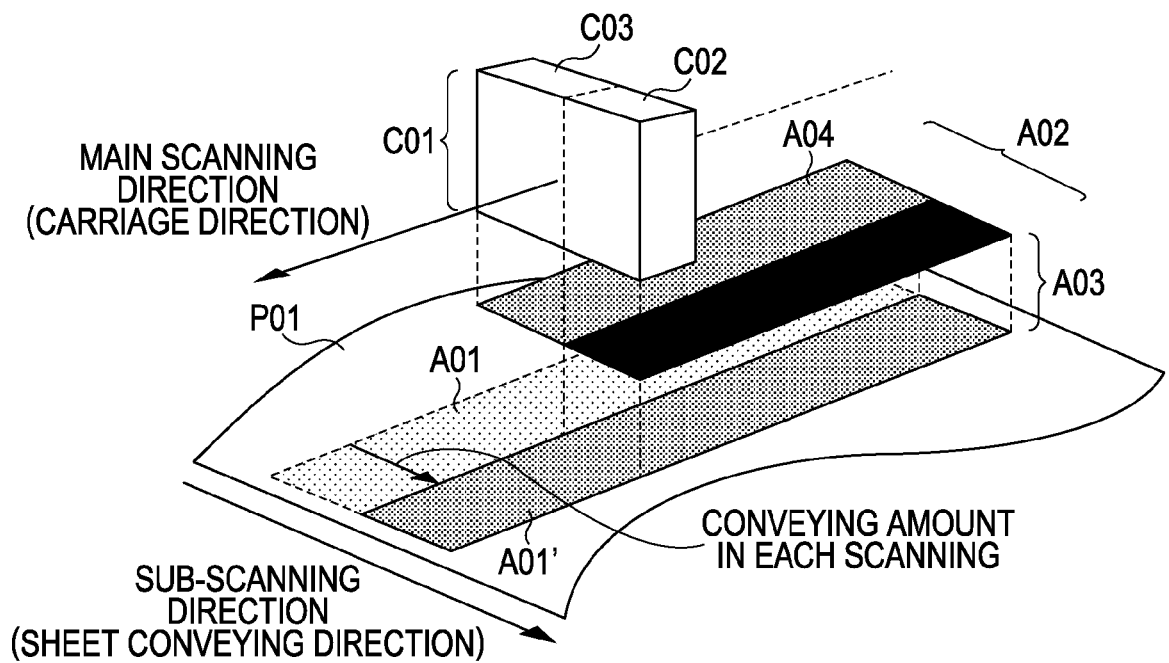
FIG. 3 is a diagram schematically illustrating a state in which a second scan is being performed using the multi-pass printing method.

After the arrangement of dots has been determined, in step S27, the print data is transmitted to the printing unit 205 and printing is started. FIG. 3 is a diagram schematically illustrating a state in which a second scan is being performed using the multi-pass printing method. A printhead C01 forms an image on a print medium P01 by ejecting ink while reciprocally moving in the main scanning direction. A font portion of the printhead C01 in the sub-scanning direction is defined as a printhead front portion C02, and a rear portion of the printhead C01 opposite to the printhead front portion C02 is defined as a printhead rear portion C03.

First, a first scan is performed. In this embodiment, since two pass scans are performed, printing is performed upon an area of half the length of the printhead in the first scan and printing is performed upon an area of the length of the printhead in a second scan and the subsequent scans. Data for a first-pass image print scan is transmitted to the rear portion C03 of half the length of the printhead C01. The printhead C01 performs the first-pass image print scan in the main scanning direction so as to print an image on a first scan image formation area A01. After the first scan has been completed, the sheet conveying apparatus conveys a print sheet in the sub-scanning direction by half the length of the printhead C01, so that the first scan image formation area A01 moves to a position A01'.

Subsequently, the second scan is performed. Data for a second-pass image print scan is transmitted to the whole of the printhead C01. The printhead C01 performs a print scan in the main scanning direction again so as to print the data for the second-pass image print scan on a second scan image formation area A02. After the second scan has been completed, the sheet conveying apparatus conveys the print sheet in the sub-scanning direction by half the length of the printhead C01 again. In a third scan, data for the first-pass image print scan is transmitted to the whole of the printhead C01. In the third scan and the subsequent scans, data for the first-pass image print scan and data for the second-pass image print scan are alternately transmitted to the printhead, and a print scan similar to the second scan is repeatedly performed. As a result, a printed image is formed.

Figure 4:
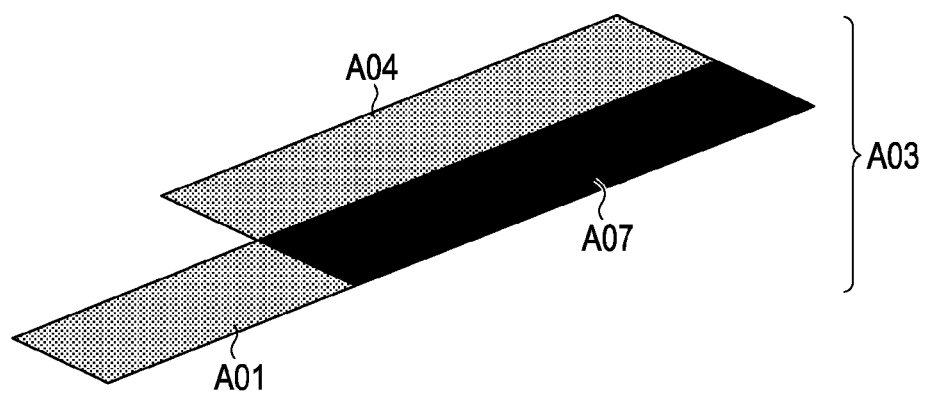
FIG. 4 is a diagram illustrating a print state of a first and second image formation area on a print medium.

FIG. 4 is a diagram illustrating a print state of a first and second image formation area A03 on a sheet. In the illustrated print state, the second scan is being performed, and the printhead is at about the midpoint of the sheet. An image formation completion area A07 is an area formed after two print scans have been completed. The image formation completion area A07 is an area obtained by overlapping the first scan image formation area A01' and a second scan image formation area A04, that is, an area obtained after printing of two pass images has been completed.

Figure 15:
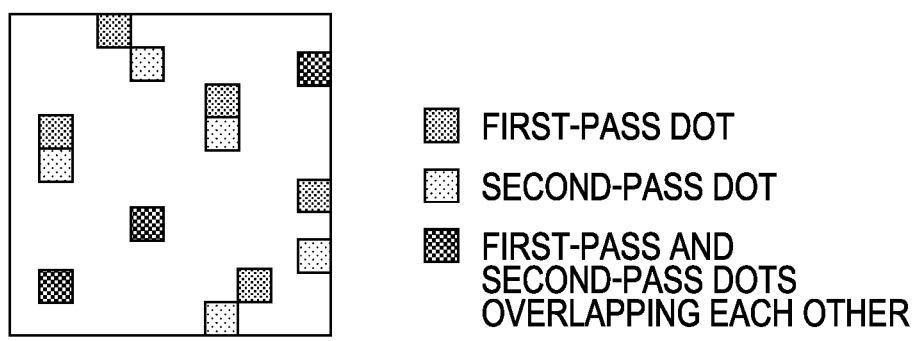
FIG. 15 is a diagram illustrating an exemplary dot arrangement in a low-density portion which is obtained after error diffusion processing has been independently performed upon two pass images.

According to this embodiment, in the dot dispersion error diffusion processing, dots are exclusively arranged in low-density portions of pass images. Since dots are exclusively arranged, the occurrence of dot sparse/dense portions can be prevented. If dots are arranged using a method in the related art, dots are randomly and sparsely arranged as illustrated in FIG. 15. On the other hand, if dots are arranged using a method according to this embodiment, the exclusive and balanced arrangement of dots is achieved as illustrated in FIG. 16.

This embodiment can be achieved using a general-purpose computer without using a dedicated architecture or a special processing apparatus.

A method of causing the dot dispersion error diffusion processing unit 209 to perform a ternary quantization method has been described. However, the dot dispersion error diffusion processing unit 209 may perform binary or higher-order quantization method.

As described previously, dot formation processing is not necessarily performed. If dot formation processing is performed, different dot arrangement methods may be used for each pass. For example, there is a method of arranging dots in the first pass using the dot layout illustrated in FIG. 11 and exclusively arranging dots in the second pass at positions different from those of the dots arranged in the first pass. If print data is generated using a method according to this embodiment, unlike an exclusive mask method, it is possible to independently perform dot formation processing for passes. Accordingly, different dot arrangements can be performed for each pass, and thus dots can be arranged with more flexibility. By appropriately arranging dots, image quality can be improved.

In this embodiment, processing is performed for each image. However, if the amount of data read from/written into a buffer is required to be reduced so as to reduce the consumption of a memory or a processing time, processing may be performed for each raster image.

An ink-jet printer is used as an example of an image forming apparatus according to this embodiment. However, any apparatus capable of forming an image by a plurality of print scans, for example, a laser printer, may be used.

According to this embodiment, density unevenness on an image formed using a multi-path printing method can be suppressed.

Figure 17:
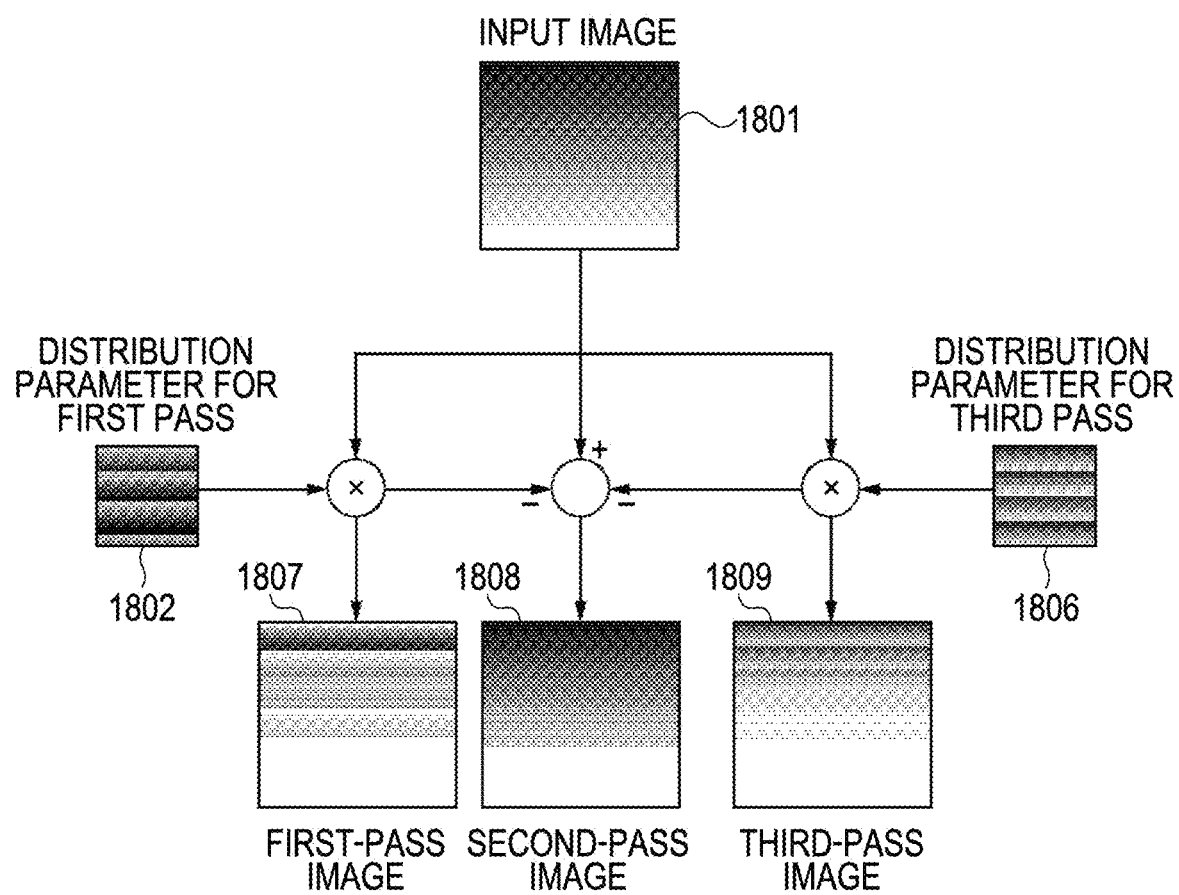
FIG. 17 is a diagram illustrating an exemplary process of creating three pass images using distribution parameters.

A second embodiment of the present invention will be described below. In the first embodiment, printing of two pass images has been described. However, the number of two or more pass images may be printed. An exemplary case in which three pass images are printed will be described. In the pass generation unit 208 described in the first embodiment, another distribution parameter having a waveform that is out of phase with that of the distribution parameter for the pass generation unit 208 is prepared, and a pixel value is divided into three portions by the two distribution parameters. FIG. 17 is a diagram illustrating an exemplary data flow when three pass images are created at the time of pass division. In the pass generation unit 208, an input image 1801, a first pass distribution parameter 1802, and a third pass distribution parameter 1806 are input. A distribution pixel value for each pixel in each pass image is calculated using the following equation so as to create a first-pass image 1807, a second-pass image 1808, and a third pass image 1809.

An input value of a selected pixel is defined as I(x, y), a first pass distribution parameter is defined as $P1(x, y)$, a third pass distribution parameter is defined as $P3(x, y)$, and a maximum parameter is defined as Pmax. A first-pass distribution pixel value $D1(x, y)$, a second-pass distribution pixel value $D2(x, y)$, and a third pass distribution pixel value $D3(x, y)$ are calculated as follows.

$$D1(x, y)=I(x, y)*P1(x, y)/Pmax$$

$$D3(x, y)=I(x, y)*P3(x, y)/Pmax$$

$$D2(x, y)=I(x, y)-D1(x, y)-D3(x, y)$$

In the dot dispersion error diffusion processing unit 209 illustrated in FIG. 5, using a three-dimensional table obtained by expanding the two-dimensional table illustrated in FIG. 10, output values are determined from input values of the three pass images. After the dot dispersion error diffusion processing has been performed, the process from step S203 to step S205 is performed for each pass.

By performing the above-described processing, the printing of three pass images can be achieved. Accordingly, multi-pass printing of not only two pass images but also a larger number of pass images such as three or four pass images may be performed.

That is, the printing of not only a small number of pass images but also a large number of pass images may be performed.

A third embodiment of the present invention will be described below. In the first embodiment, similar processing is performed for each color. However, different pieces of processing may be performed for each color. For example, if printing is performed with the C, M, Y, and K colors, a method according to the first embodiment may be applied to printing with the C, M, and K colors that are relatively high-visibility colors, and another method in the related art may be applied to printing with the Y color that is a relatively low-visibility color.

As described previously, for example, if high-speed image processing is required, a method according to the first embodiment is applied to printing with a high-visibility color and a method in the related art is applied to printing with colors other than the high-visibility color. On the other hand, if high-quality printing is required, a method according to the first embodiment is applied to printing with all colors. Thus, embodiments of the present invention can provide flexibility in selecting processing to be performed.

A fourth embodiment of the present invention will be described below. The pass generation unit 208 according to the first embodiment may not use the distribution parameter, and may distribute a pixel value using equation. For example, if pass generation is performed under the circumstance in which it is difficult to obtain a buffer for the distribution parameter, it is preferable that a pixel value be distributed using equation. For example, if equation is used for printing of two pass images, a distribution ratio may be periodically changed using a trigonometric function as will be described in the following equations.

These equations indicate a case in which a change is produced only in the carriage direction.

$$D1(x, y)=I(x, y)*P*(1+\sin(2\pi x/T))/2$$

$$D2(x, y)=I(x, y)-D1(x, y)$$

In these equations, I(x, y) denotes an input value of a selected pixel, P denotes an amplitude, T denotes a periodicity, D1 denotes a first-pass distribution pixel value, and D2 denotes a second-pass distribution pixel value.

Figure 18:
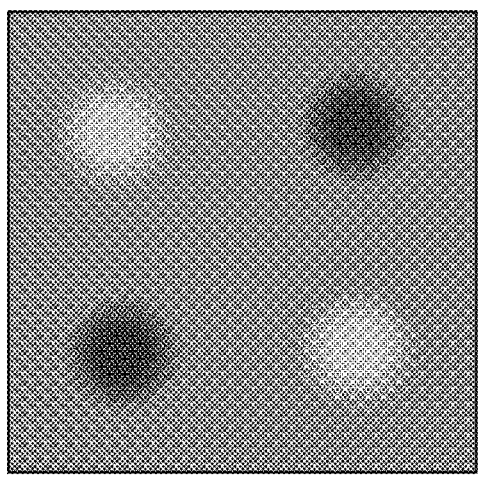
FIG. 18 is a diagram illustrating an exemplary distribution parameter in which circles are symmetric.

Such a spatial change may be produced in either the carriage direction or the sheet feeding direction or in an oblique direction. Alternatively, such a spatial change may be produced so that circles are symmetric as illustrated in FIG. 18. As a method of producing such a change, not only a method of periodically producing a change but also a method of changing periodicity in accordance with a position and a method of combining a plurality of periodic changes may be used.

Figure 19:
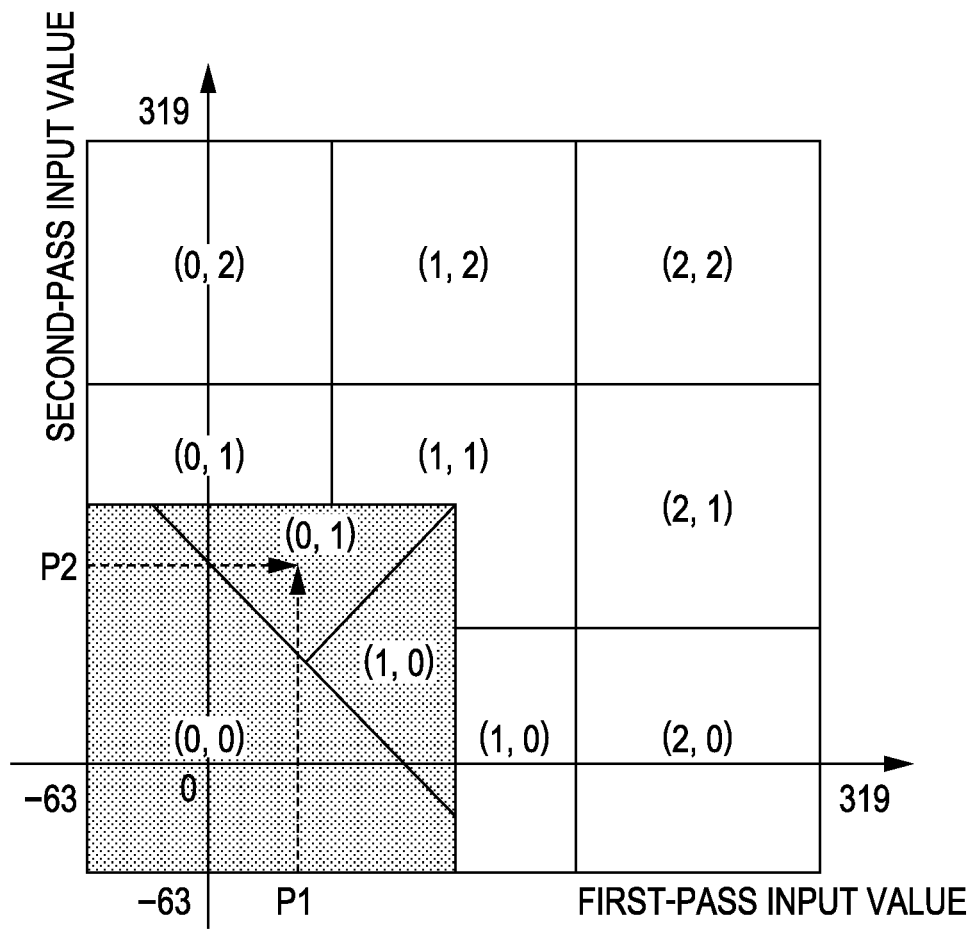
FIG. 19 is a diagram illustrating an exemplary lookup table used to determine whether a pixel value obtained after the distribution of each pixel value to passes is a low-density value.

A fifth embodiment of the present invention will be described below referring to the drawings. In the first embodiment, the dot dispersion error diffusion processing unit 209 illustrated in FIG. 5 uses a table for adopting the exclusive arrangement of dots in a case where an input pixel value (the sum of input values of first-pass and second-pass images) obtained before the distribution of each pixel value to pass images is a low-density value. However, the dot dispersion error diffusion processing unit 209 may use a table for adopting the exclusive arrangement of dots in a case where a pixel value obtained after the distribution of each pixel value to pass images is a low-density value. In this case, the region 2901 in which error diffusion processing is independently performed upon pass images and the region 2902 in which error diffusion processing is exclusively performed upon pass images are changed by changing a parameter for the table used by the dot dispersion error diffusion processing unit 209 (for example, as illustrated in FIG. 19).

A sixth embodiment of the present invention will be described below. In the first embodiment, the dot dispersion error diffusion processing unit 209 uses a table. However, under the circumstance in which it is difficult to obtain a buffer for the table, equation may be used instead of the table. For example, Japanese Patent Laid-Open No. 2000-354172 discloses a method of comparing the input values of cyan and magenta with each other and determining the output values of cyan and magenta on the basis of the comparison result. For example, by applying this method to the processing performed upon pass images, output values can be determined using equation. In the following equations and inequalities, P1 represents a first-pass input value, P2 denotes a second-pass input value, T1, T2, S1, and S2 represent threshold values, O1 represents a first-pass output value, and O2 represents a second-pass output value. The following equations and inequalities are merely examples used to determine an output value according to the first embodiment, and it should be understood that the following equations and inequalities are changed in a case where possible input values and possible output values are different from input values and output values in the following equations and inequalities.

When $P1+P2 \leq T1$, $(O1, O2)=(0,0)$.

When $T1<P1+P2 \leq T2$, if $P2 \leq P1$, $(O1, O2)=(1, 0)$, and if not $P2 \leq P1$, $(O1, O2)=(0, 1)$.

When $T2<P1+P2$, in each input P (=P1, P2), if $P \leq S1$, $P=0$, if $S1<P \leq S2$, $P=1$, and if $S2<P$, $P=2$.

The followings are exemplary equations and inequalities applying specific threshold values.

When $P1+P2 \leq 124$, $(O1, O2)=(0, 0)$.

When $124<P1+P2<251$, if $P2 \leq P1$, $(O1, O2)=(1, 0)$, and if not $P2 \leq P1$, $(O1, O2)=(0, 1)$.

When $251<P1+P2$, in each input P (=P1, P2), if $P \leq 64$, $P=0$, if $64<P \leq 191$, $P=1$, and if $191<P$, $P=2$.

The threshold values used in the above-described inequalities are merely exemplary values in this embodiment. For example, threshold values different from the above-described threshold values may be used, and threshold values may be changed during error diffusion processing.

A seventh embodiment of the present invention will be described below. In the fifth embodiment, the dot dispersion error diffusion processing unit 209 illustrated in FIG. 5 uses a table. However, under the circumstance in which it is difficult to obtain a buffer for the table, equation may be used instead of the table. For example, using the following equations and inequalities, the output values are determined. In the following equations and inequalities, P1 represents a first-pass input value, P2 denotes a second-pass input value, T1, T2, and S1 represent threshold values, O1 represents a first-pass output value, and O2 represents a second-pass output value. The followings are exemplary equations and inequalities used to determine an output value according to the first embodiment, and it should be understood that the following equations and inequalities are changed in a case where possible input values and possible output values are different from input values and output values in the following equations and inequalities. It is assumed that, in each input P (=P1, P2), $P \leq T1$.

When $P1+P2 \leq S1$, $(O1, O2)=(0, 0)$.

When $S1<P1+P2$, if $P2<P1$, $(O1, O2)=(1, 0)$, if not $P2 \leq P1$, $(O1, O2)=(0, 1)$, if $T1<P \leq T2$, $P=1$, and if $T2<P$, $P=2$.

The followings are exemplary equations and inequalities applying specific threshold values. It is assumed that, in each input P (=P1, P2), $P \leq 192$.

When, $P1+P2 \leq 124$, $(O1, O2)=(0, 0)$.

When $124<P1+P2$, if $P2 \leq P1$, $(O1, O2)=(1, 0)$, if not $P2 \leq P1$, $(O1, O2)=(0, 1)$, if $192<P \leq 255$, $P=1$, and if $255<P \leq 319$, $P=2$.

The threshold values used in the above-described inequalities are merely exemplary values in this embodiment. For example, threshold values different from the above-described threshold values may be used, and threshold values may be changed during error diffusion processing.

An eighth embodiment of the present invention will be described below. In the first embodiment, the dot dispersion error diffusion processing unit 209 illustrated in FIG. 1 performs the dot dispersion error diffusion processing. However, the dot dispersion error diffusion processing unit 209 may perform another type of dot dispersion error diffusion processing different from that described in the first embodiment. For example, the dot dispersion error diffusion processing unit 209 may use different error diffusion processing parameters for each pass. Examples of such an error diffusion processing parameter include a parameter for defining quantization threshold values for error diffusion processing and a parameter for changing a threshold value.

For example, an error diffusion method in which different error diffusion threshold values are used for each pass will be described. A high threshold value Th=170 is used for a first pass, and a low threshold value T1=85 is used for a second pass. Using these threshold values, error diffusion processing is performed. In a low-density portion, each time the error diffusion processing is performed upon a predetermined area, the threshold values are interchanged.

If print data is generated using a method according to this embodiment, pass images are generated and then quantization processing is performed upon these pass images. Accordingly, at the time of the quantization processing, different parameters can be used for each pass image, and the setting of a parameter can be performed with more flexibility as compared with a method in the related art. That is, a more appropriate quantization parameter can be applied, and print quality can be therefore improved. If the same parameter is used for each pass at the time of the quantization processing and inputs having similar variations are provided for passes, similar dot patterns are generated in the passes as quantization results. Such dot patterns generated in the passes easily interfere with each other. This causes degradation in image quality. If different parameters are used for each pass at the time of the quantization processing, different quantization results can be obtained in the passes even when inputs having similar variations are provided for the passes. This can prevent the interference of dot patterns generated in the passes, and leads to improvement in image quality.

The present invention may be achieved in such a manner that a computer-readable storage medium storing a program code of software for implementing the functions of the above-described embodiments is supplied to a system or an apparatus, and a computer (or a CPU or MPU) of the system or apparatus reads out the program code from the storage medium and executes the read program code. In this case, a program code itself read out from the storage medium achieves the functions of the above-described embodiments. That is, the present invention also includes the storage medium storing the program code.

As the storage medium for providing a program code, for example, a flexible disk, a hard disk, an optical disc, a magneto-optical disk, a CD-ROM, a CD-R, a magnetic tape, a nonvolatile memory card, a ROM, or a DVD may be used.

The computer executes the read program code to achieve the functions of the above-described embodiments. Furthermore, an OS (Operating System) or the like running on the computer may perform part or all of actual processing under instructions of the program code to achieve the functions of the above-described embodiments.

Still furthermore, the program code read out from the storage medium may be written to a memory provided in a function expansion board inserted into the computer or in a function expansion unit connected to the computer. Subsequently, a CPU or the like provided in the function expansion board or the function expansion unit may perform part or all of actual processing under instructions of the program code so as to achieve the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-091558 filed Mar. 31, 2008, which is hereby incorporated by reference herein in its entirety.

What is claimed is:

1. An image processing apparatus for generating print data to be used for an image forming apparatus for performing image formation by performing a plurality of print scans upon the same image area on a print medium, the image processing apparatus comprising:
    a dividing unit configured to divide image data corresponding to a color component into pieces of print scan image data for the plurality of print scans, by distributing a pixel value of each pixel of the image data corresponding to the color component to each of the plurality of print scans;
    a quantization unit configured to quantize the pieces of print scan image data; and
    a generation unit configured to generate pieces of print data for the plurality of print scans on the basis of the quantized pieces of print scan image data, and
    wherein the quantization unit quantizes a first piece of print image data and a second piece of print image data among the pieces of print scan image data of the same color component to prevent dots of the first piece of print image data and the second piece of print image data from overlapping each other in a case where a density represented by the pieces of print scan image data is a low density,
    wherein the quantization unit refers to a lookup table, wherein in the lookup table, an input value of the first piece of print image data and an input value of the second piece of print image data are input, and each output value is determined based on the input values, and
    wherein in a low density region, the lookup table outputs output values determined under the influence of each of the input values, and in a high density region, the lookup table outputs output values independent of the input values.

2. The image processing apparatus according to claim 1, wherein, in a case where a density represented by the pieces of print scan image data is a high density, the quantization unit quantizes the pieces of print scan image data so that they are mutually independent in the plurality of print scans.

3. The image processing apparatus according to claim 1, wherein the quantization unit performs quantization by performing error diffusion processing.

4. The image processing apparatus according to claim 3, wherein the quantization unit performs quantization by performing dot dispersion error diffusion processing.

5. The image processing apparatus according to claim 1, wherein the quantization unit performs quantization upon a part of color components of the image data.

6. The image processing apparatus according to claim 1, wherein the quantization unit performs quantization upon all of color components of the image data.

7. An image processing method of generating print data to be used for an image forming apparatus for performing image formation by performing a plurality of print scans upon the same image area on a print medium, the image processing method comprising:
    dividing image data corresponding to a color component into pieces of print scan image data for the plurality of print scans, by distributing a pixel value of each pixel of the image data corresponding to the color component to each of the plurality of print scans;
    quantizing the pieces of print scan image data; and
    generating pieces of print data for the plurality of print scans on the basis of the quantized pieces of print scan image data, and
    wherein a first piece of print image data and a second piece of print image data are quantized among the pieces of print scan image data of the same color component to prevent dots of the first piece of print image data and the second piece of print image data from overlapping each other in a case where a density represented by the pieces of print scan image data is a low density, wherein the quantizing refers to a lookup table, wherein in the lookup table, an input value of the first piece of print image data and an input value of the second piece of print image data are input, and each output value is determined based on the input values, and wherein in a low density region, the lookup table outputs output values determined under the influence of each of the input values, and in a high density region, the lookup table outputs output values independent of the input values.

8. The image processing method according to claim 7, wherein, in a case where a density represented by the pieces of print scan image data is a high density, the pieces of print scan image data are quantized so that they are mutually independent in the plurality of print scans.

9. The image processing method according to claim 7, wherein quantization is performed by performing error diffusion processing.

10. The image processing method according to claim 9, wherein quantization is performed by performing dot dispersion error diffusion processing.

11. The image processing method according to claim 7, wherein quantization is performed upon a part of color components of the image data.

12. The image processing method according to claim 7, wherein quantization is performed upon all of color components of the image data.

13. A non-transitory computer-readable storage medium containing computer-executable instructions for controlling an image processing apparatus for generating print data to be used for an image forming apparatus for performing image formation by performing a plurality of print scans upon the same image area on a print medium, the medium comprising:

computer-executable instructions that divide image data corresponding to a color component into pieces of print scan image data for the plurality of print scans, by distributing a pixel value of each pixel of the image data corresponding to the color component to each of the plurality of print scans;

computer-executable instructions that quantize the pieces of print scan image data; and computer-executable instructions that generate pieces of print data for the plurality of print scans on the basis of the quantized pieces of print scan image data, wherein a first piece of print image data and a second piece of print image data are quantized among the pieces of print scan image data of the same color component to prevent dots of the first piece of print image data and the second piece of print image data from overlapping each other in a case where a density represented by the pieces of print scan image data is a low density, wherein quantize refers to a lookup table, wherein in the lookup table, an input value of the first piece of print image data and an input value of the second piece of print image data are input, and each output value is determined based on the input values, and wherein in a low density region, the lookup table outputs output values determined under the influence of each of the input values, and in a high density region, the lookup table outputs output values independent of the input values.

14. An image processing apparatus for generating print data to be used for an image forming apparatus for performing image formation by performing a plurality of print scans upon the same image area on a print medium, the image processing apparatus comprising:

a dividing unit configured to divide image data corresponding to a color component into pieces of print scan image data for the plurality of print scans, by distributing a pixel value of each pixel of the image data corresponding to the color component to each of the plurality of print scans;

a quantization unit configured to quantize the pieces of print scan image data; and a generation unit configured to generate pieces of print data for the plurality of print scans on the basis of the quantized pieces of print scan image data, and wherein the quantization unit quantizes a first piece of print image data and a second piece of print image data among the pieces of print scan image data of the same color component to prevent dots of the first piece of print image data and the second piece of print image data from overlapping each other are mutually exclusive in the plurality of print scans in a case where a density represented by the pieces of print scan image data is a low density, wherein the quantization unit compares the sum of an input value of the first piece of print image data and an input value of the second piece of print image data with a threshold value, outputs output values determined under the influence of each of the input values in a case where the sum represents a low density, and outputs output values independent of the input values in a case where the sum represents a high density.

15. An image processing method of generating print data to be used for an image forming apparatus for performing image formation by performing a plurality of print scans upon the same image area on a print medium, the image processing method comprising:

dividing image data corresponding to a color component into pieces of print scan image data for the plurality of print scans, by distributing a pixel value of each pixel of the image data corresponding to the color component to each of the plurality of print scans;

quantizing the pieces of print scan image data; and generating pieces of print data for the plurality of print scans on the basis of the quantized pieces of print scan image data, and wherein a first piece of print image data and a second piece of print image data are quantized among the pieces of print scan image data of the same color component to prevent dots of the first piece of print image data and the second piece of print image data from overlapping each other in a case where a density represented by the pieces of print scan image data is a low density, wherein the quantizing compares the sum of an input value of the first piece of print image data and an input value of the second piece of print image data with a threshold value, outputs output values determined under the influence of each of the input values in a case where the sum represents a low density, and outputs output values independent of the input values in a case where the sum represents a high density.

16. A non-transitory computer-readable storage medium containing computer-executable instructions for controlling an image processing apparatus for generating print data to be used for an image forming apparatus for performing image formation by performing a plurality of print scans upon the same image area on a print medium, the medium comprising:

computer-executable instructions that divide image data corresponding to a color component into pieces of print scan image data for the plurality of print scans, by distributing a pixel value of each pixel of the image data corresponding to the color component to each of the plurality of print scans;

computer-executable instructions that quantize the pieces of print scan image data; and computer-executable instructions that generate pieces of print data for the plurality of print scans on the basis of the quantized pieces of print scan image data, wherein-a first piece of print image data and a second piece of print image data are quantized among the pieces of print scan image data of the same color component to prevent dots of the first piece of print image data and the second piece of print image data from overlapping each other in a case where a density represented by the pieces of print scan image data is a low density, wherein the quantizing compares the sum of an input value of the first piece of print image data and an input value of the second piece of print image data with a threshold value, outputs output values determined under the influence of each of the input values in a case where the sum represents a low density, and outputs output values independent of the input values in a case where the sum represents a high density.

* * * * *